W. F. & R. L. JENKINS.
EMERGENCY WHEEL RIM.
APPLICATION FILED SEPT. 25, 1908.
942,909.
Patented Dec. 14, 1909.
2 SHEETS—SHEET 1.
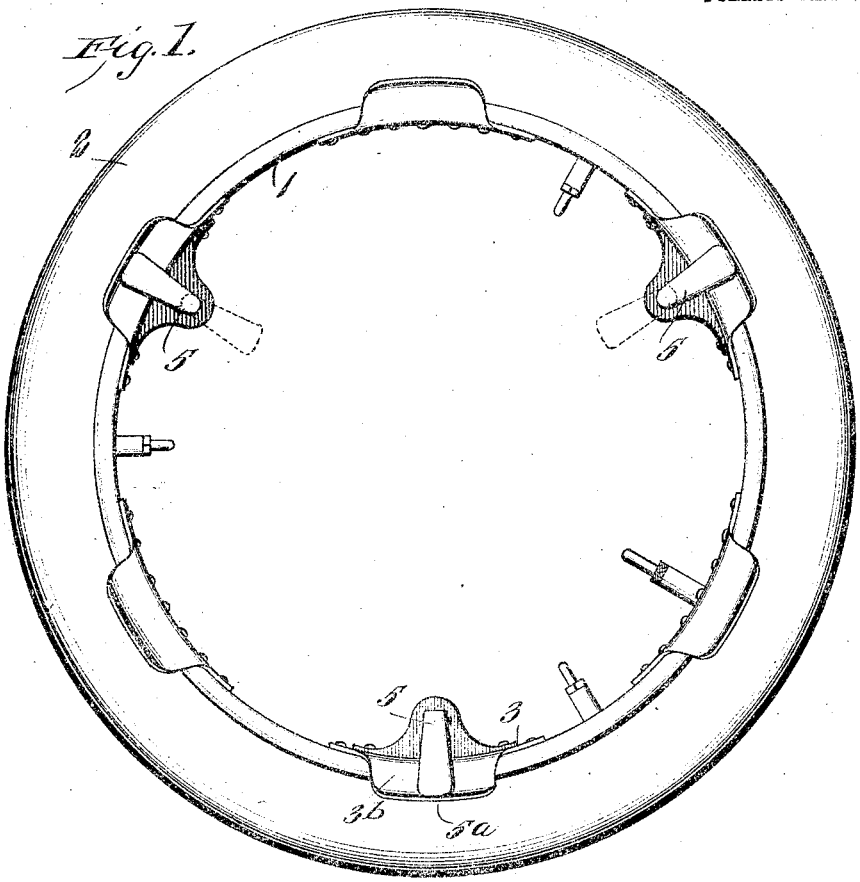
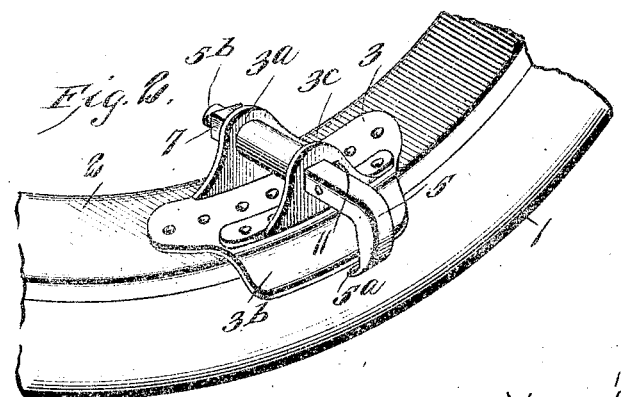
WITNESSES
INVENTORS
WILTON F. JENKINS
ROBERT L. JENKINS
BY
ATTORNEYS W. F. & R. L. JENKINS.
EMERGENCY WHEEL RIM.
APPLICATION FILED SEPT. 25, 1908.
942,909.
Patented Dec. 14, 1909.
2 SHEETS—SHEET 2.
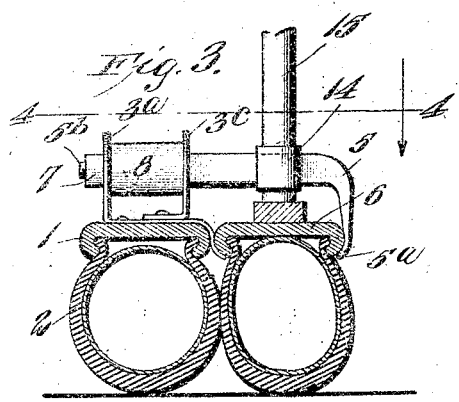
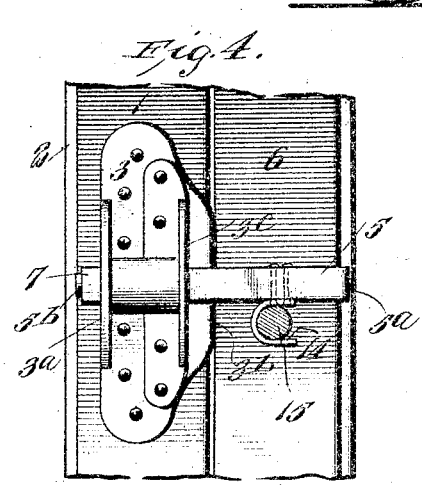
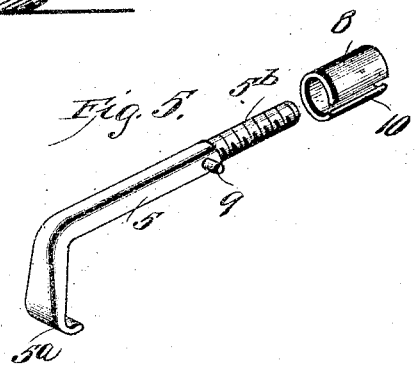
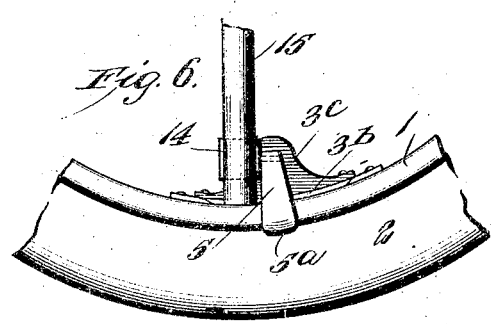
WITNESSES
E. M. Callaghan
L. A. Stanley
INVENTORS
WILTON F. JENKINS
ROBERT L. JENKINS
BY Munn & Co.
ATTORNEYS

UNITED STATES PATENT OFFICE.

WILTON F. JENKINS AND ROBERT L. JENKINS, OF RICHMOND, VIRGINIA.

EMERGENCY WHEEL-RIM.

942,909.  Specification of Letters Patent.  Patented Dec. 14, 1909.

Application filed September 25, 1908. Serial No. 454,693.

*To all whom it may concern:*

Be it known that we, WILTON F. JENKINS and ROBERT L. JENKINS, citizens of the United States, and residents of Richmond, in the county of Henrico and State of Virginia, have made certain new and useful Improvements in Emergency Wheel-Rims, of which the following is a specification.

Our invention relates to attachments for wheels using pneumatic tires and is particularly applicable to the wheels of automobiles or similar motor vehicles, and it consists in the combinations, arrangements and constructions herein described and claimed.

Ordinarily an extra tire is carried on automobiles which can only be put on the rim of the wheel after considerable delay and trouble. Our invention does away with the necessity of fitting the tire to the rim. The devise may be quickly applied in case a tire should be punctured, does not require an expensive kit of tools, and by its use protects the punctured tire from further injury without the necessity of its removal.

An object of our invention is to provide an auxiliary rim which can be attached to the rim of the wheel and which relieves the injured tire from the weight of the vehicle.

A further object of our invention is to provide an attaching means which is simple in construction but is strong and durable and which can be locked in its normal position ready for attachment, so that the working parts thereof are kept from rattling when not in use.

Other objects and advantages will appear in the following specification and will be particularly pointed out in the appended claims.

Our invention is illustrated in the accompanying drawings in which similar reference characters indicate similar parts in the several views, and in which—

Figure 1 is a side view of the invention; Fig. 2 is an enlarged detail view in perspective of an attaching member. Fig. 3 is a transverse sectional view through the main and auxiliary rims. Fig. 4 is a plan view of the parts shown in Fig. 3. Fig. 5 is a perspective view of one of the clamps, and Fig. 6 is a side view of a portion of the main rim and the clamping device.

Referring now to the drawings, we have shown therein an auxiliary or emergency rim 1 carrying a tire 2, which is inflated ready for use. Riveted or otherwise secured to the rim 1 is a series of plates 3 provided with an integral inturned flange $3^a$ on one side and a outwardly and laterally curved flange $3^b$ on the other. At the inner edge of the latter an inwardly extending flange $3^c$, similar in shape to the flange $3^a$, is secured to the plate 3. The plate 3 and the two flanges $3^a$ and $3^c$ constitute a standard for the attaching member.

The attaching members consist of clamp bolts 5, each provided with a hooked end $5^a$ adapted to fit the rim 6 of the automobile wheel, as clearly shown in Fig. 3. The opposite end $5^b$ of the clamp-bolt is threaded and is arranged to receive a nut 7. The clamp-bolts are designed to enter alined openings in the upright flanges $3^a$ and $3^c$ and disposed on the bolts are the split collars or sleeves 8. Each clamp is provided with a pin 9 adapted to enter the slot 10 in the sleeve.

The operation of our invention can be readily understood from the foregoing description of the various parts.

The emergency tire and rim is carried with the vehicle in the same manner that the extra tire is ordinarily carried. In assembling the attaching parts the split collars are slipped between the flanges, the bolts are inserted through the openings and the pin 9 is turned to register with a lateral extension 11 of the opening in the flange $3^c$. The collar, however, is turned so that its edge lies across the opening 11 so that the pin cannot pass through. The nut 7 is now tightened and the clamping member is firmly locked so that it cannot work loose or rattle. The positions of the clamping bolts in their normally locked condition is shown in Fig. 1. In this figure the lower bolt is shown in its normally locked position, also in its operative position by the full lines, while the two upper clamps are shown in their locked position in dotted lines and in their operative position in full lines. When now a tire is punctured, the auxiliary rim is placed beside the wheel with the clamp bolts in their normally locked positions. The rim is thrust forward, the three bolts passing between the spokes of the wheel, and allowed to rest on the lower bolt. The nut of the latter is loosened allowing the turning of the collar until the slot 10 comes opposite the opening 11. The pin then enters the slot and permits the hook of the clamp bolt to be brought up close to the rim of the wheel as shown in Fig. 3. The nut is now tightened and the rim is clamped securely between the hook 5ª of the bolt and the flange 3ᵇ, which forms a socket for the opposite side of the rim. The other bolts are loosened, turned outwardly and the upper parts of the rim are clamped in a similar manner. The sleeve 8 serves as a stiffening member for the flanges, thereby giving great stability to the device. The relative positions of the auxiliary and main rims as shown in Fig. 3.

In Fig. 3 as well as Figs. 4 and 6 we have shown a hook 14 which may be secured to the bolt 5 in any suitable manner and which is designed to fit the spoke 15 to prevent any possible slipping of the rim. It may be stated however that it is not always necessary to use the hook 14 since in actual practice the clamping mechanism shown in Figs. 1 and 2 in which the hook 14 is omitted has been found to hold the rim without slipping. Our invention however contemplates the use of the hook 14, if necessary.

The emergency rim described may be attached very quickly, and the ordinary wrench carried with every automobile is all that is required to manipulate the attaching parts.

We claim—

1. The combination with a wheel, of an auxiliary rim therefor, a standard on said rim having an outwardly turned flange having a curved portion constituting a socket, an extension bolt carried by said standard and provided with a hooked end, and means for clamping the rim of the wheel between said hooked end and said socket.

2. The combination with a wheel, of an auxiliary rim therefor, perforated flanges secured to said rim, a clamping bolt disposed in the perforations in said flanges, a sleeve loosely disposed on said bolt between said flanges, and means for locking said bolt in its extended position of disuse.

3. The combination with a wheel, of an auxiliary rim therefor, a plate secured to said rim and provided with perforated flanges, a clamping bolt provided with a pin disposed in the perforations in said flanges, a slotted collar disposed on said bolt between said flanges adapted to engage the pin on said bolt to lock the latter and arranged to be turned to permit the entrance of the pin in said slot.

4. The combination with a wheel, of an auxiliary rim therefor, a plate secured to said rim and provided with inwardly extending perforated flanges and an outwardly extending flange having a curved portion constituting a socket, a clamp provided with a pin disposed in the perforations in said flanges, and arranged to hold said rim against said curved flange, and means for extending said bolt thereby releasing the rim and for locking the bolt in its extended position of disuse.

5. The combination with a wheel, of an auxiliary rim therefor, a plate secured to said rim and provided with inwardly extending perforated flanges and an outwardly extending curved flange constituting a socket adapted to receive the edge of the auxiliary rim, a clamping bolt provided with a hook and a pin disposed in the perforations in said flanges, a slotted collar disposed on said bolt between said flanges and adapted to engage the pin on said bolt to lock the latter and arranged to be turned to permit the entrance of the pin in said slot, and means for clamping the rim between the hook of said bolt and said socket.

WILTON F. JENKINS.
ROBERT L. JENKINS.

Witnesses:
EDWARD L. RYAN,
CHAS. U. WILLIAMS, Jr.